(12) United States Patent
Zhou et al.

(10) Patent No.: US 11,964,888 B2
(45) Date of Patent: Apr. 23, 2024

(54) CIRCULAR ROTARY-DISC DEHYDRATOR WITH MULTI-FILTER CYLINDER UNIT

(71) Applicant: YIXING PIONIERE ENVIRONMENTAL PROTECTION EQUIPMENT CO., LTD., Wuxi (CN)

(72) Inventors: Daopeng Zhou, Wuxi (CN); Jiwei Lu, Wuxi (CN); Guoqiang Qian, Wuxi (CN)

(73) Assignee: YIXIING PIONERE ENVIRONMENTAL PROTECTION EQUIPMENT CO., LTD., Wuxi (CN)

( * ) Notice: Subject to any disclaimer, the term of this patent is extended or adjusted under 35 U.S.C. 154(b) by 0 days.

(21) Appl. No.: 18/352,880

(22) Filed: Jul. 14, 2023

(65) Prior Publication Data
US 2024/0043304 A1 Feb. 8, 2024

Related U.S. Application Data

(63) Continuation of application No. PCT/CN2023/102353, filed on Jun. 26, 2023.

(30) Foreign Application Priority Data

Aug. 8, 2022 (CN) .......................... 202210941280.0

(51) Int. Cl.
*C02F 11/125* (2019.01)
*C02F 11/14* (2019.01)

(52) U.S. Cl.
CPC ............ *C02F 11/125* (2013.01); *C02F 11/14* (2013.01); *C02F 2201/005* (2013.01); *C02F 2209/42* (2013.01)

(58) Field of Classification Search
CPC .. C02F 11/14; C02F 11/125; C02F 2201/005; C02F 11/121; C02F 2201/002; C02F 2209/42; C02F 1/52; C02F 1/001; C02F 1/5281; C02F 9/04; B01D 33/37; B01D 33/64; B01D 33/76; B01D 33/80
USPC ........................................................ 210/203
See application file for complete search history.

(56) References Cited

U.S. PATENT DOCUMENTS

2021/0129059 A1* 5/2021 Harden .................. B01D 33/50

* cited by examiner

*Primary Examiner* — Akash K Varma
(74) *Attorney, Agent, or Firm* — Westbridge IP LLC (57) ABSTRACT

Disclosed is a circular rotary-disc dehydrator with a multi-filter cylinder unit. A dehydrator body is internally provided with a middle plate so that the dehydrator body is separated into a water entrance area and a filtrate area. One side, located in the filtrate area, of the middle plate is provided with a circular rotary disc, a circle of holes is arranged around the circular rotary disc, and one side of the circular rotary disc is provided with a filter cylinder corresponding to the holes; The circular rotary disc is arranged in the filtrate area, and a plurality of filter cylinder units are uniformly distributed on the rotary disc. In the rotation process, it may be fed continuously and sludge may be discharged continuously; the filter cylinders have a self-cleaning function, and consume less water, thus not only the production is increased, but also the dehydrating effect is guaranteed.

10 Claims, 9 Drawing Sheets

CIRCULAR ROTARY-DISC DEHYDRATOR WITH MULTI-FILTER CYLINDER UNIT

CROSS-REFERENCE TO RELATED APPLICATIONS

This application is a continuation of International Application No. PCT/CN2023/102353, filed on Jun. 26, 2023, which claims priority to Chinese Patent Application No. 202210941280.0, filed on Aug. 8, 2022. All of the aforementioned applications are incorporated herein by reference in their entireties.

TECHNICAL FIELD

The present application relates to the field of dehydrators, in particular to a circular rotary-disc dehydrator with a multi-filter cylinder unit.

BACKGROUND

Sludge is an inevitable product of sewage treatment, it contains high water content, and in order to reduce the pollution of sludge to the environment, the sludge is dehydrated before disposal. At present, commonly used sludge dewatering equipment includes multi-disc screw press, a plate and frame filter press, and a belt press herein the plate and frame filter press may not run continuously; the belt press is easy to get blocked, and requires a large amount of water for cleaning; and in the traditional screw press, one screw shaft corresponds to one drive motor, and when the treatment capacity is large, it is necessary to increase the diameter and length of the screw shaft or increase the number of the screw shafts. However, when the diameter is large, the dehydrating effect is not good, and the number of the screw shafts is increased, the energy consumption is also increased. In addition, in order to guarantee the dehydration time and increase the screw length, the sludge volume in a dehydrating chamber is relatively large, and there is only an extruding force at a sludge outlet, so the dehydration efficiency is low.

SUMMARY

A purpose of the present application is to provide a circular rotary-disc dehydrator with a multi-filter cylinder unit.

The innovation point of the present application lies in the fact that in the present application, the circular rotary disc is arranged in the filtrate area, a plurality of filter cylinder units are uniformly distributed on the rotary disc, and in the rotation process, it may be fed continuously and sludge may be discharged continuously; the filter cylinders have a self-cleaning function, and consume less water, to achieve the continuous work of the plurality of the filter cylinder units, not only the production is increased, but also the dehydrating effect is guaranteed.

In order to achieve the above purpose of the present application, a technical scheme of the present application is as follows: a circular rotary-disc dehydrator with a multi-filter cylinder unit includes a dehydrator body, the dehydrator body is internally provided with a middle plate so that the dehydrator body is separated into a water entrance area and a filtrate area; one side, located in the filtrate area, of the middle plate is provided with a circular rotary disc, a circle of holes is arranged around the circular rotary disc, one side of the circular rotary disc is provided with a filter cylinder corresponding to the holes, the filter cylinder includes a front plate and a rear plate, and between the front plate and the rear plate, a plurality of movable rings and fixed rings are arranged at intervals to form a side wall of the filter cylinder; the rear plate is provided with a first through hole that communicates the interior of the filter cylinder with the holes, the fixed rings are connected to the front plate and the rear plate by a connecting rod, a plurality of spacing washers are arranged between two adjacent fixed rings, the thickness of the movable ring is slightly less than that of the spacing washer, and the movable ring is within an inner ring formed by the connection of the plurality of the spacing washers; a screw shaft is arranged at the center of the filter cylinder, the filter cylinder is internally provided with a shaft connected to all movable rings, the shaft is connected with the screw shaft, and an end portion, away from the circular rotary disc, of the screw shaft is provided with a gear; a lower portion of the middle plate is provided with a water inlet area, an upper portion of the middle plate is provided with a sludge outlet area, a ring gear track meshed with the gear is arranged in the filtrate area, the ring gear track is divided into an upper-section gear track and a lower-section gear track, the upper-section gear track and the lower-section gear track are respectively located on inner and outer sides of the gear, the lower-section gear track corresponds to the water inlet area, and the upper-section gear track corresponds to a non-water inlet area; a portion, located in the water entrance area, of the middle plate is provided with a sludge outlet channel, and a side wall of the sludge outlet channel is provided with a sludge outlet; and a driving assembly that drives the circular rotary disc to rotate is arranged in the filtrate area, and the filtrate area is provided with liquid discharge ports.

Further, the filtrate area is a closed structure, and the filtrate area is provided with a vacuumizing port. The negative pressure accelerates the dehydration of the filter cylinder.

Further, the water entrance area is also a closed structure, and the water entrance area is provided with a ventilating port communicated with the vacuumizing port. Air is extracted from the filtrate area and enters the water inlet area, so that it is a positive pressure in the water inlet area and it is a negative pressure in the filtrate area, a pressure difference is produced between the inside and outside of the filter cylinder, and the flow of sewage inside the filter cylinder is accelerated, thus the dehydrating effect of the filter cylinder is more apparent.

Further, a liquid level meter is arranged in the filtrate area, the filtrate area is provided with two liquid discharge ports, and one of the liquid discharge ports is provided with a valve. When the liquid level reaches the lower filter cylinder of the circular rotary disc, the valve is opened to accelerate the outward discharge of the filtrate, and when the liquid level is at a low level, the valve is closed, so that the filtrate area is always kept in the negative pressure state.

Further, a spraying assembly is arranged in the filtrate area, and the spraying assembly is located between the sludge outlet area and the water inlet area. During a cycle period, after the sludge inside the filter cylinder is emptied, the filter cylinder is cleaned by a spraying pipe, water for cleaning may be reduced, and the cleaning effect is good.

Further, the circular rotary disc is inclined towards one side away from the water entrance area. It is beneficial to the flow of the filtrate towards a tail portion of the filter cylinder, and it is easier for filtrate separation.

Further, the inclination angle is 0~5°.

Further, a circle of wear-resistant plates is arranged between the circular rotary disc and the middle plate, and the wear-resistant plates are located in the non-water inlet area and the non-sludge outlet area, and cover the holes. The wear on the circular rotary disc and the middle plate is reduced.

Further, the water entrance area is a flocculation stirring area, the flocculation stirring area is provided with a metering tank, and the metering tank is provided with a sewage inlet and an overflow port; and a stirrer is arranged in the flocculation stirring area. It would have a better effect if flocculated firstly, and then filtered; and flocculation mixing, dehydration, and filtrate storage and discharge are integrated, thus the structure is compact.

Further, the fixed ring is provided with a second through hole for passing through the connecting rod, the spacing washer is provided with a third through hole for passing through the connecting rod, the front plate and the rear plate are provided with a fourth through hole for passing through the connecting rod, and both ends of the connecting rod are limited by a limiting assembly; the connecting rod is a threaded rod, and the limiting assembly is a nut; the movable rings are provided with a fifth through hole for passing through the shaft; the fifth through hole is a hexagonal hole, and the cross section of the shaft is hexagonal; and the shaft and the screw shaft are connected by connecting plate.

The beneficial effects of the present application are as follows.

In the present application, the circular rotary disc is arranged in the filtrate area, the plurality of the filter cylinder units are uniformly distributed on the rotary disc, and in the rotation process, it may be fed continuously and the sludge may be discharged continuously; the filter cylinders have a self-cleaning function, and consume less water, to achieve the continuous work of the plurality of the filter cylinder units, thus not only the production is increased, but also the dehydrating effect is guaranteed.

In the present application, the upper-section gear track and the lower-section gear track are arranged, and the filter cylinder automatically changes the tracks, so that the screw shaft is always in an extruding state during the process of water entrance to sludge discharge, and during dehydrating and extruding, the filter cylinder is in a slightly inclined state, the filtrate after extruding is flowed to the tail portion of the filter cylinder, and there is no subsequent sewage entering, thus the dehydrating effect is good.

In the present application, the water entrance area and the filtrate area are fully closed, it is the positive pressure in the water entrance area and the negative pressure in the filtrate area, the flow of the sewage and filtrate is accelerated, and the dehydration efficiency is improved; and in the fully closed structure, odors are not emitted externally, thus the working environment is improved.

In the present application, the emptied filter cylinder is cleaned, the amount of water used is less, and the cleaning effect is good.

In the present application, the filter cylinder units may be replaced as a whole, so the maintenance is convenient and fast.

In the present application, the flocculation mixing, dehydration, and filtrate storage and discharge are integrated, thus the structure is compact.

DETAILED DESCRIPTION OF THE EMBODIMENTS

Technical schemes in embodiments of the present application are clearly and completely described below in combination with the drawings.

Figure 1:
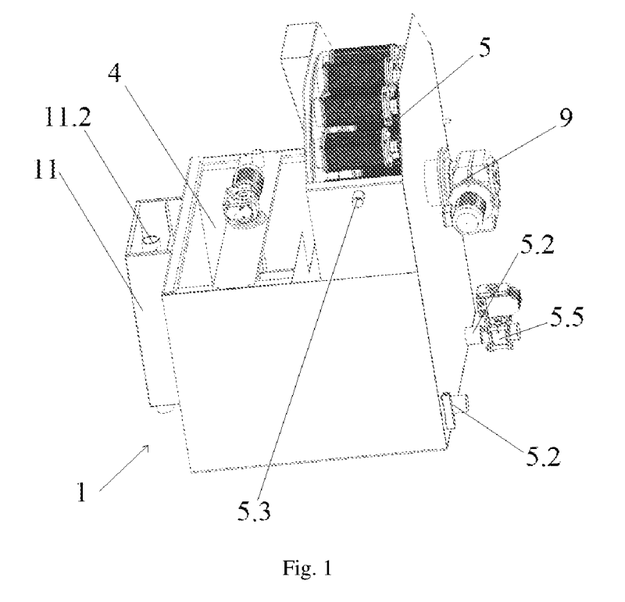
FIG. 1 is a structure schematic diagram of Embodiment 1 after a cover is opened.
Figure 2:
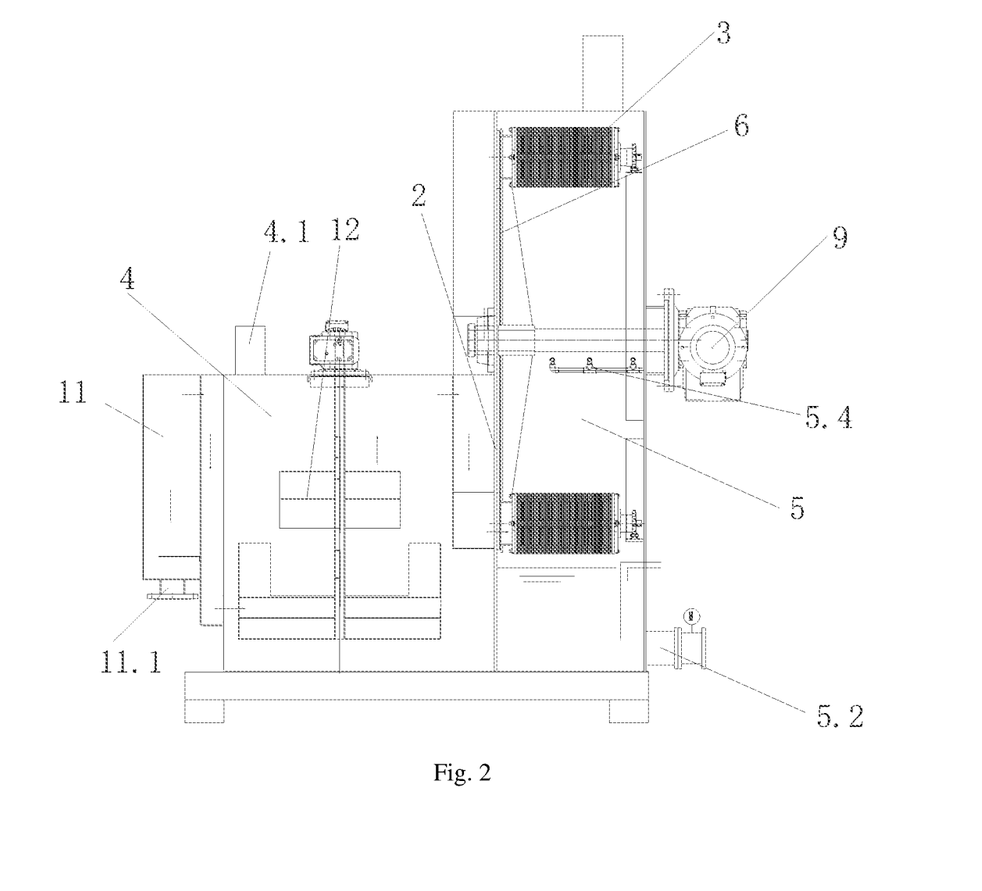
FIG. 2 is a cross-sectional schematic diagram of Embodiment 1.
Figure 3:
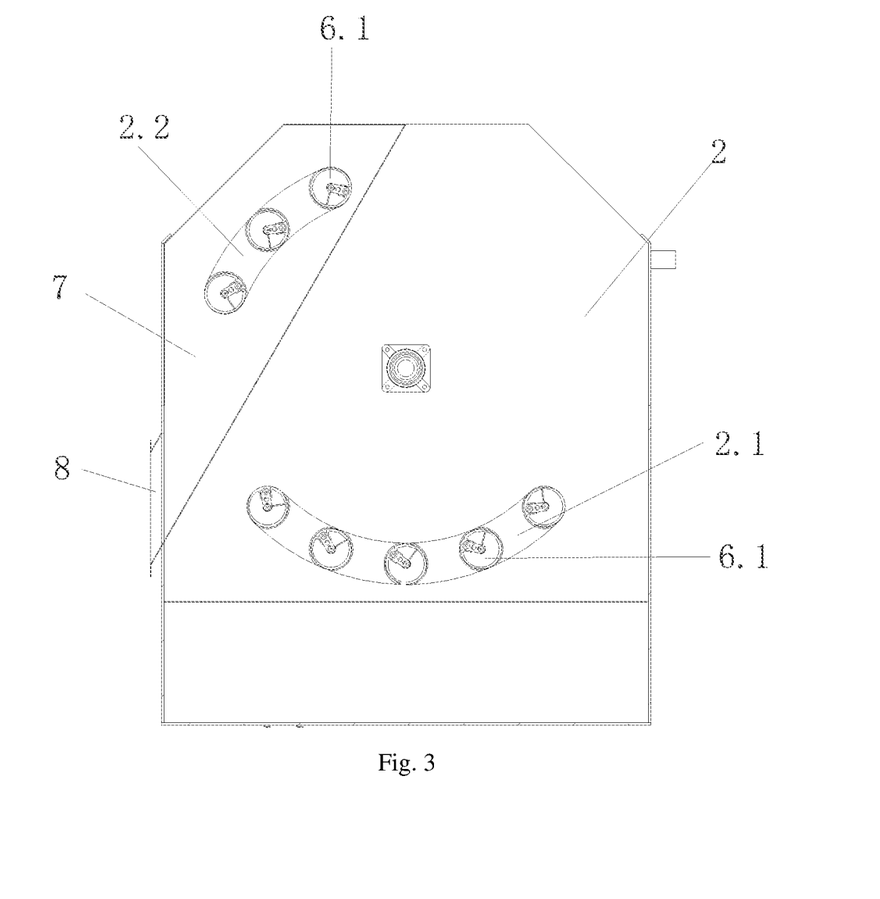
FIG. 3 is a layout diagram of one side, located in a water entrance area, of a middle plate.
Figure 4:
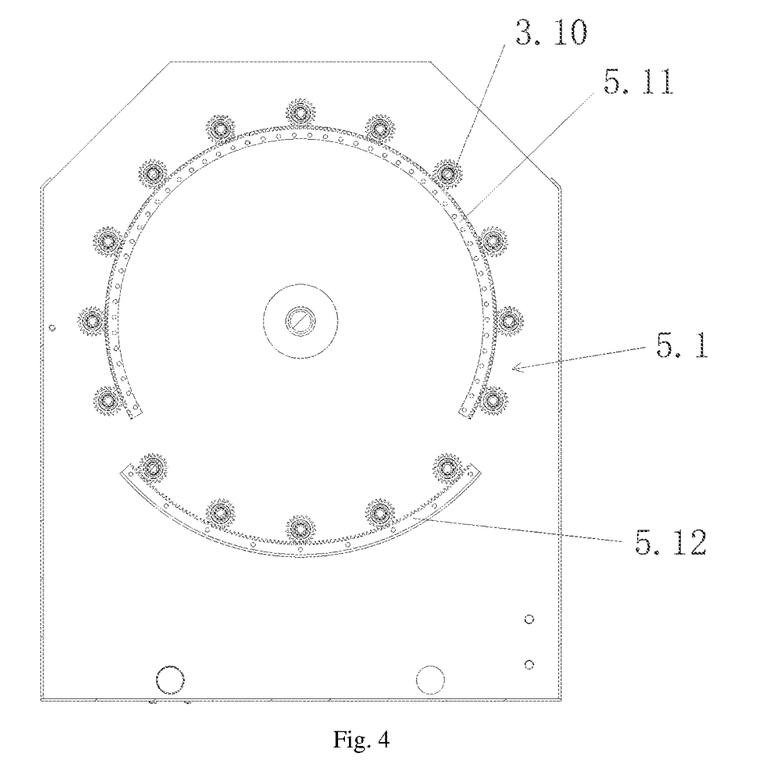
FIG. 4 is a layout diagram of a ring gear track.
Figure 5:
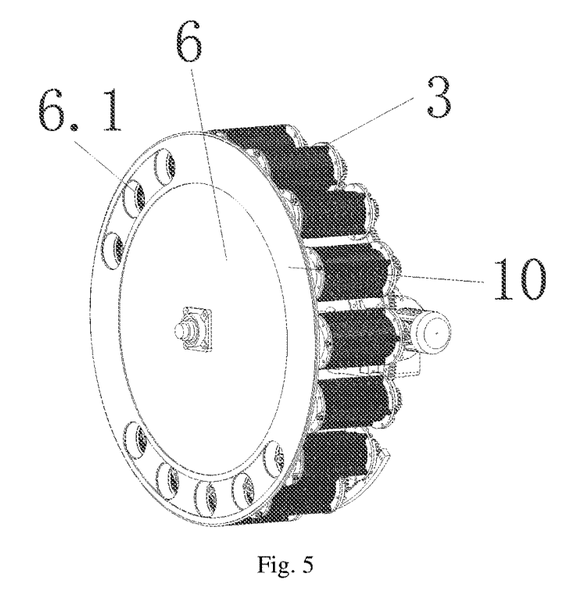
FIG. 5 is a layout diagram of a wear-resistant plate.
Figure 6:
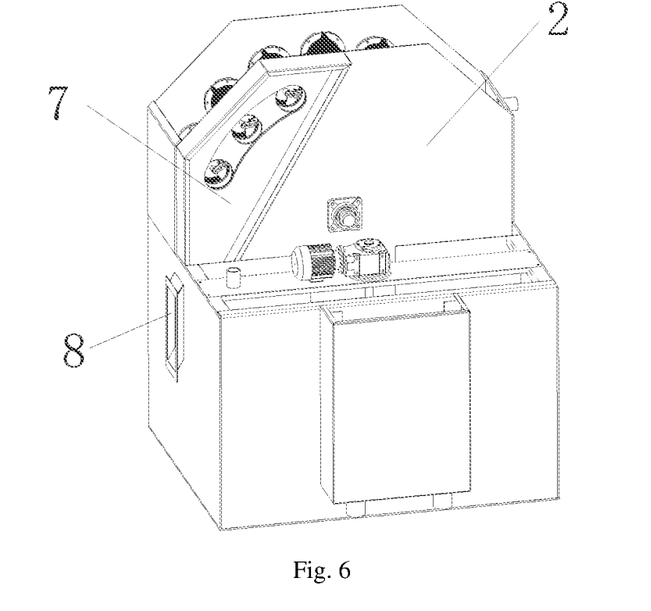
FIG. 6 is a layout diagram of a sludge discharge channel and a sludge outlet.
Figure 7:
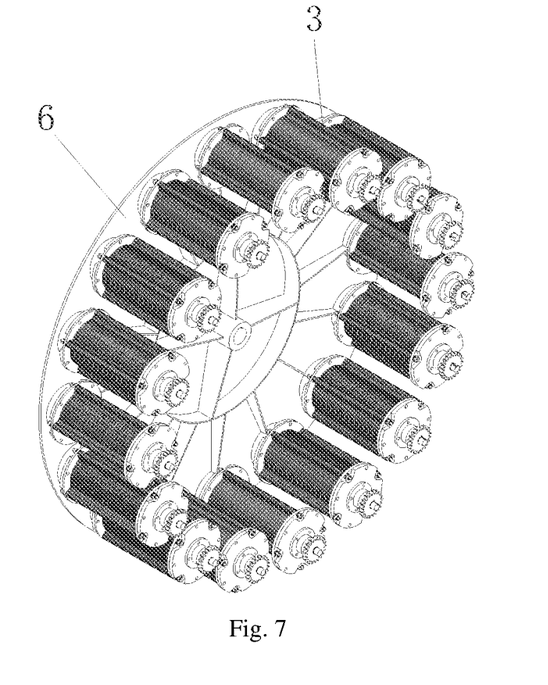
FIG. 7 is a structure schematic diagram of a circular rotary disc and a filter cylinder.
Figure 8:
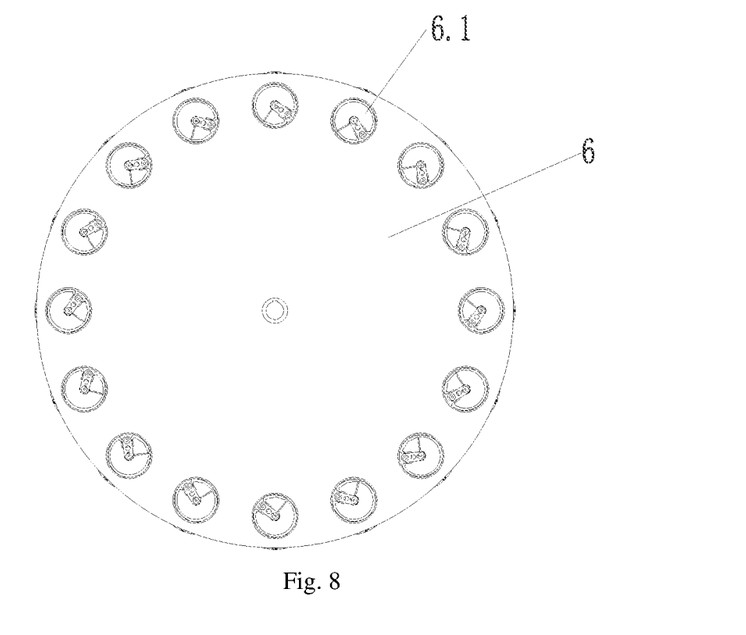
FIG. 8 is a schematic diagram of a hole.
Figure 9:
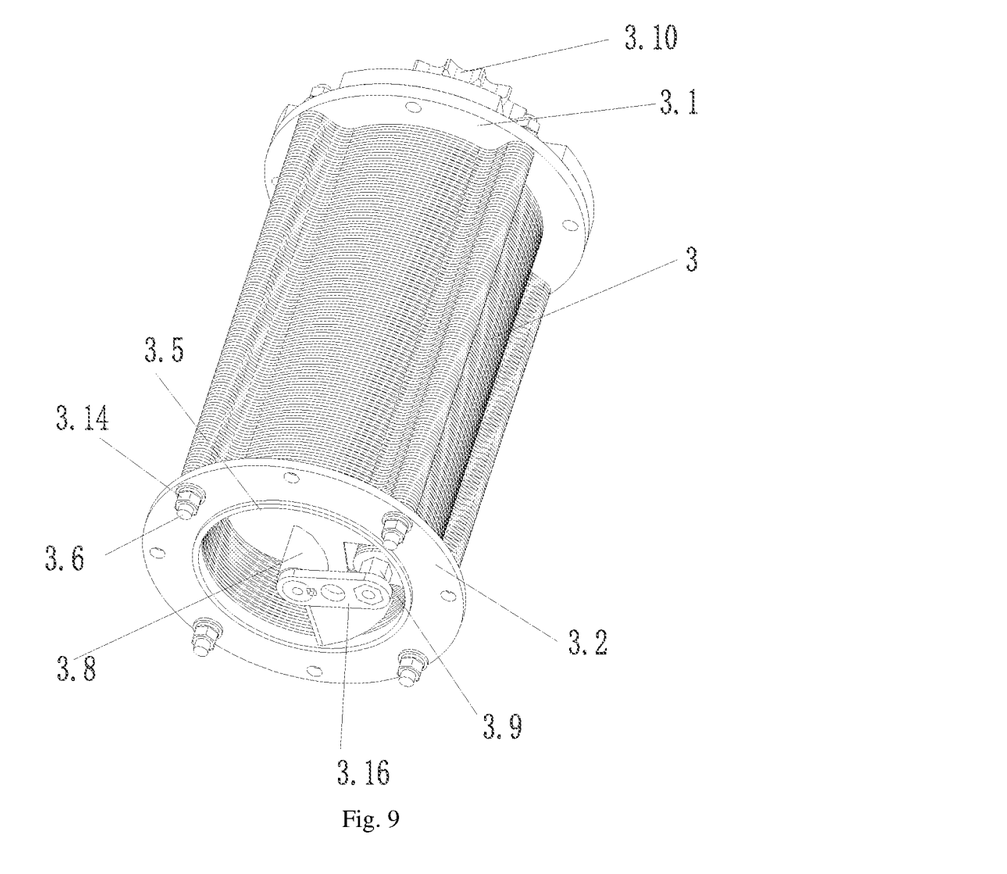
FIG. 9 is a structure schematic diagram of the filter cylinder.
Figure 10:
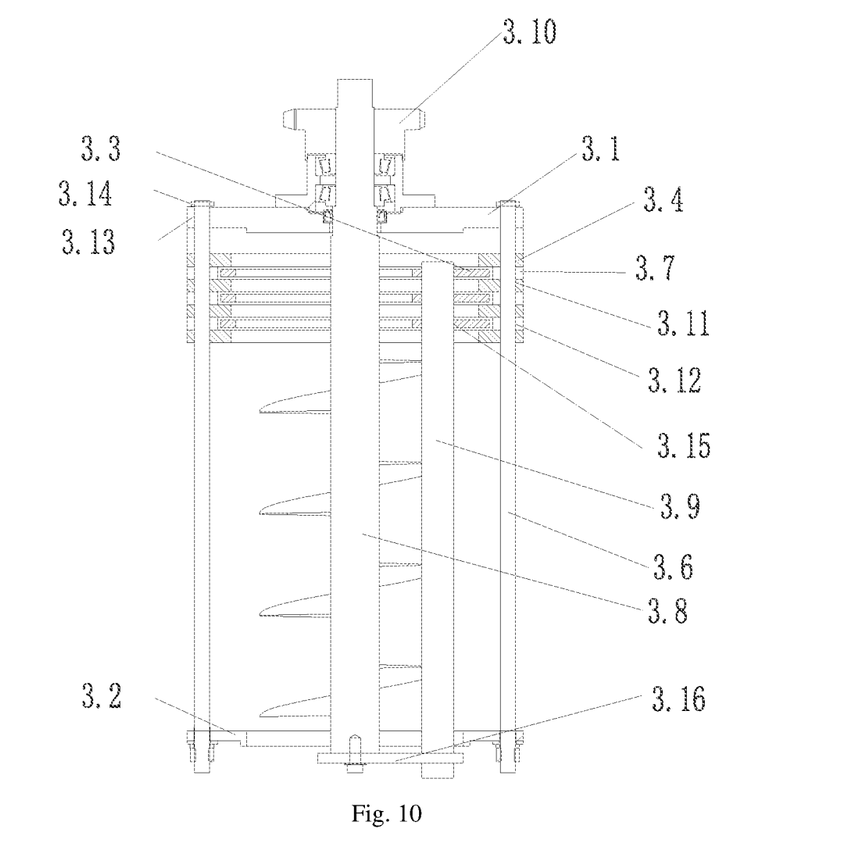
FIG. 10 is a cross-sectional view of the filter cylinder.
Figure 11:
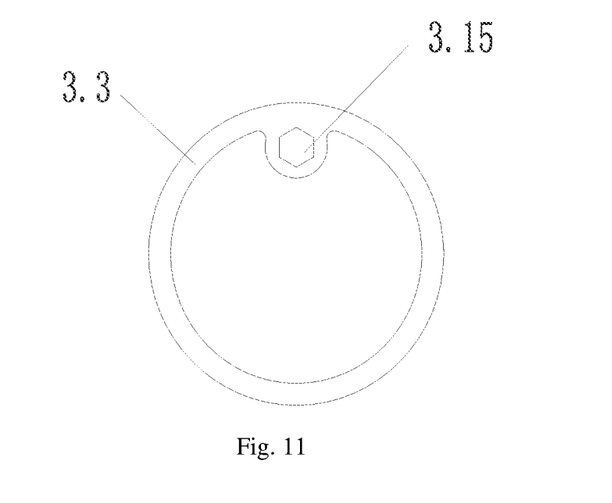
FIG. 11 is a structure schematic diagram of a movable ring.
Figure 12:
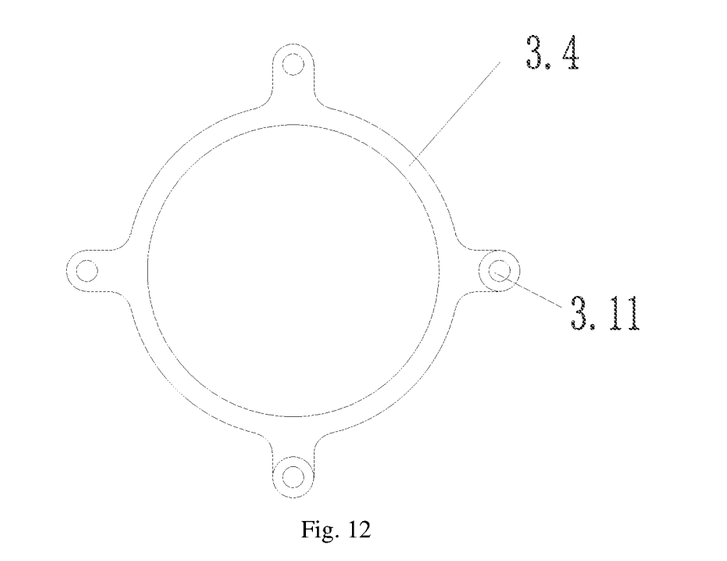
FIG. 12 is a structure schematic diagram of a fixed ring.

Embodiment 1: as shown in FIGS. 1-12, a circular rotary-disc dehydrator with a multi-filter cylinder unit includes a dehydrator body 1, the dehydrator body 1 is internally provided with a middle plate 2 so that the dehydrator body is separated into a water entrance area 4 and a filtrate area 5, the water entrance area 4 is a flocculation stirring area, a metering tank 11 is arranged in the flocculation stirring area, and the metering tank 11 is provided with a sewage inlet 11.1 and an overflow regulating pipe 11.2; and a stirrer 12 is arranged in the flocculation stirring area. One side, located in the filtrate area 5, of the middle plate 2 is provided with a circular rotary disc 6, a circle of holes 6.1 is arranged on the circular rotary disc 6, one side of the circular rotary disc 6 is provided with a filter cylinder 3 corresponding to the holes 6.1, the filter cylinder 3 includes a front plate 3.1 and a rear plate 3.2, and between the front plate 3.1 and the rear plate 3.2, a plurality of movable rings 3.3 and fixed rings 3.4 are arranged at intervals to form a side wall of the filter cylinder 3; the rear plate 3.2 is provided with a first through hole 3.5 that communicates the interior of the filter cylinder 3 with the holes 6.1, the fixed rings 3.4 are connected to the front plate 3.1 and the rear plate 3.2 by a connecting rod 3.6, a plurality of spacing washers 3.7 are arranged between two adjacent fixed rings 3.4, the thickness of the movable ring 3.3 is slightly less than that of the spacing washer 3.7, and the movable ring 3.3 is within an inner ring formed by the connection of the plurality of the spacing washers 3.7; a screw shaft 3.8 is arranged at the center of the filter cylinder 3, the screw shaft 3.8 is equipped with spiral blades, which are used to drive sewage to flow into filter cylinder 3 and compress to accelerate dehydration, the filter cylinder 3 is internally provided with a shaft 3.9 connected to all movable rings 3.3, the shaft 3.9 is connected with the screw shaft 3.8, and the shaft 3.9 is connected with the screw shaft 3.8 by a plurality of connecting plates 3.16; an end portion, away from the circular rotary disc 6, of the screw shaft 3.8 is provided with a gear 3.10; a lower portion of the middle plate 2 is provided with a water inlet area 2.1, an upper portion of the middle plate 2 is provided with a sludge outlet area 2.2 (as shown in FIG. 3), a ring gear track 5.1 meshed with the gear 3.10 is arranged in the filtrate area 5, the ring gear track 5.1 is divided into an upper-section gear track 5.11 and a lower-section gear track 5.12, the upper-section gear track 5.11 and the lower-section gear track 5.12 are respectively located on inner and outer sides of the gear 3.10, the lower-section gear track 5.12 corresponds to the water inlet area 2.1, and the upper-section gear track 5.12 corresponds to a non-water inlet area; a circle of wear-resistant plates 10 is arranged between the circular rotary disc 6 and the middle plate 2, and the wear-resistant plates 10 are located in the non-water inlet area and the non-sludge outlet area, and cover the holes 6.1; a portion, located in the water entrance area 4, of the middle plate 2 is provided with a sludge outlet channel 7, and a side wall of the sludge outlet channel 7 is provided with a sludge outlet 8; and a driving assembly 9 that drives the circular rotary disc 6 to rotate is arranged in the filtrate area 5, and the filtrate area 5 is provided with liquid discharge ports 5.2.

The filtrate area 5 is a closed structure, and the filtrate area 5 is provided with a vacuumizing port 5.3. The water entrance area 4 is also a closed structure, the water entrance area 4 is provided with a ventilating port 4.1 communicated with the vacuumizing port 5.3, and a pipeline communicated with the vacuumizing port 5.3 and the ventilating port 4.1 is provided with a vacuum pump.

A liquid level meter is arranged in the filtrate area 5, the filtrate area 5 is provided with two liquid discharge ports 5.2, and one of the liquid discharge ports 5.2 is provided with a valve 5.5. A spraying assembly 5.4 is arranged in the filtrate area 5, and the spraying assembly 5.4 is located between the sludge outlet area 2.2 and the water inlet area 2.1.

The fixed ring 3.4 is provided with a second through hole 3.11 for passing through the connecting rod 3.6, the spacing washer 3.7 is provided with a third through hole 3.12 for passing through the connecting rod 3.6, the front plate 3.1 and the rear plate 3.2 are provided with a fourth through hole 3.13 for passing through the connecting rod 3.6, and both ends of the connecting rod 3.6 are limited by a limiting assembly 3.14; the connecting rod 3.6 is a threaded rod, and the limiting assembly 3.14 is a nut; the movable rings 3.3 are provided with a fifth through hole 3.15 for passing through the shaft 3.9; the fifth through hole 3.15 is a hexagonal hole, and the cross section of the shaft 3.9 is hexagonal; and the shaft 3.9 and the screw shaft 3.8 are connected by the plurality of the connecting plates 3.16.

Figure 13:
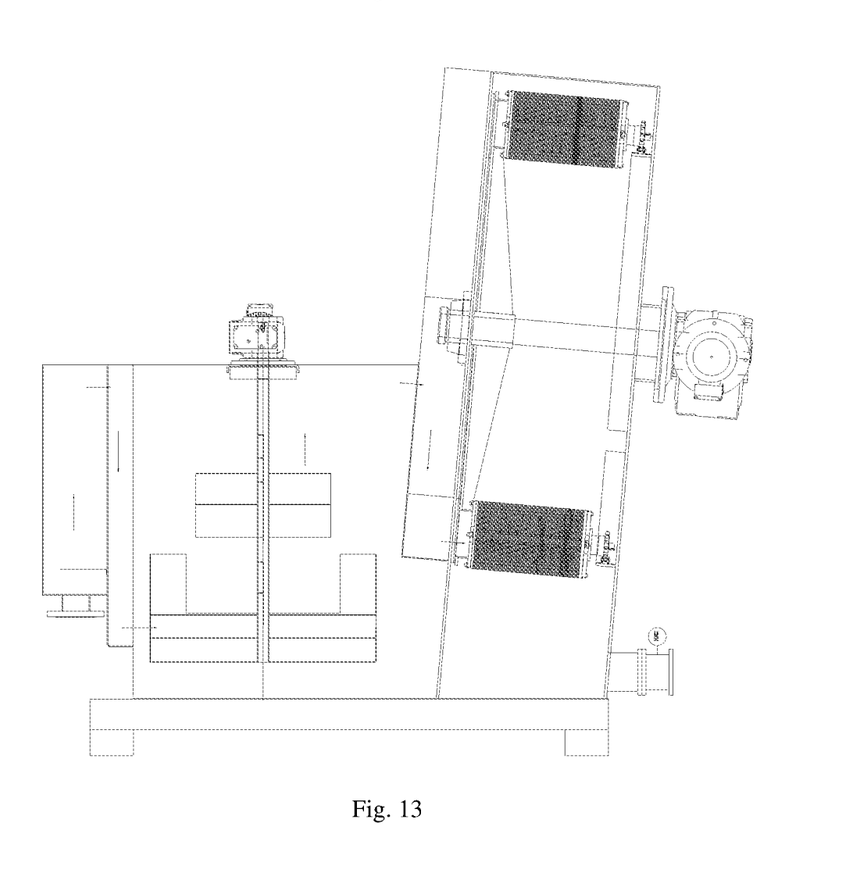
FIG. 13 is a cross-sectional schematic diagram of Embodiment 2.

Embodiment 2: referring to Embodiment 1, as shown in FIG. 13, the circular rotary disc 6 is inclined towards one side away from the water entrance area 4, and the inclination angle is 0~5°.

During operation, the sewage enters the flocculation stirring area from the metering tank 11, the flocculated sewage enters the holes 6.1 from the water inlet area 2.1 on the middle plate 2, and then enters the filter cylinder 3 from the holes 6.1; the lower-section gear track 5.12 drives the screw shaft 3.8 inside the filter cylinder to rotate, the sewage is accelerated to be flowed into the filter cylinder 3 and extruded to accelerate the dehydration, liquid is flowed out from a gap between the movable ring 3.3 and the fixed ring 3.4; the screw shaft 3.8 drives the movable ring 3.3 to rotate by the shaft 3.9, and a solid in the gap between the movable ring 3.3 and the fixed ring 3.4 is automatically cleaned; then, when the circular rotary disc 6 rotates the filter cylinder 3 to the upper-section gear track 5.11, the screw shaft 3.8 is rotated reversely to push and extrude the sludge outwards, and in the sludge outlet area 2.2, the direction of the screw shaft 3.8 is rotated so that the sludge material is unloaded to the sludge outlet channel 7 and discharged from the sludge outlet 8, and the filtrate is discharged from the liquid discharge ports 5.2.

The embodiments described are only a part of the embodiments of the present application, not all of the embodiments. Based on the embodiments in the present application, all other embodiments obtained by those of ordinary skill in the art without creative labor shall fall within the scope of protection of the present application.

What is claimed is:

1. A circular rotary-disc dehydrator with a multi-filter cylinder unit, comprising a dehydrator body, wherein the dehydrator body is internally provided with a middle plate so that the dehydrator body is separated into a water entrance area and a filtrate area; one side, located in the filtrate area, of the middle plate is provided with a circular rotary disc, a circle of holes is arranged around the circular rotary disc, one side of the circular rotary disc is provided with a filter cylinder corresponding to the circle of holes, the filter cylinder comprises a front plate and a rear plate, and between the front plate and the rear plate, a plurality of movable rings and fixed rings are arranged at intervals to form a side wall of the filter cylinder; the rear plate is provided with a first through hole that communicates an interior of the filter cylinder with the circle of holes, the fixed rings are connected to the front plate and the rear plate by a connecting rod, a plurality of spacing washers are arranged between two adjacent fixed rings, a thickness of the movable ring is slightly less than tea thickness of the spacing washer, and the movable ring is within an inner ring formed by a connection of the plurality of spacing washers; a screw shaft is arranged at a center of the filter cylinder, the filter cylinder is internally provided with a shaft connected to all movable rings of the plurality of moveable rings, the shaft is connected with the screw shaft, and an end portion, away from the circular rotary disc, of the screw shaft is provided with a gear; a lower portion of the middle plate is provided with a water inlet area, an upper portion of the middle plate is provided with a sludge outlet area, a ring gear track meshed with a gear is arranged in the filtrate area, the ring gear track is divided into an upper-section gear track and a lower-section gear track, the upper-section gear track and the lower-section gear track are respectively located on inner and outer sides of the gear, the lower-section gear track corresponds to the water inlet area, and the upper-section gear track corresponds to a non-water inlet area; a portion, located in the water entrance area, of the middle plate is provided with a sludge outlet channel, and a side wall of the sludge outlet channel is provided with a sludge outlet; and a driving assembly that drives the circular rotary disc to rotate is arranged in the filtrate area, and the filtrate area is provided with liquid discharge ports.

2. The circular rotary-disc dehydrator with the multi-filter cylinder unit according to claim 1, wherein the filtrate area is a closed structure, and the filtrate area is provided with a vacuumizing port.

3. The circular rotary-disc dehydrator with the multi-filter cylinder unit according to claim 2, wherein the water entrance area is also a closed structure, and the water entrance area is provided with a ventilating port communicated with the vacuumizing port.

4. The circular rotary-disc dehydrator with the multi-filter cylinder unit according to claim 1, wherein a liquid level meter is arranged in the filtrate area, the filtrate area is provided with two liquid discharge ports, and one of the two liquid discharge ports is provided with a valve.

5. The circular rotary-disc dehydrator with the multi-filter cylinder unit according to claim 1, wherein a spraying assembly is arranged in the filtrate area, and the spraying assembly is located between the sludge outlet area and the water inlet area.

6. The circular rotary-disc dehydrator with the multi-filter cylinder unit according to claim 1, wherein the circular rotary disc is inclined towards one side away from the water entrance area.

7. The circular rotary-disc dehydrator with the multi-filter cylinder unit according to claim 6, wherein an inclination angle is 0~5°.

8. The circular rotary-disc dehydrator with the multi-filter cylinder unit according to claim 1, wherein a circle of wear-resistant plates is arranged between the circular rotary disc and the middle plate, and the circle of wear-resistant plates are located in the non-water inlet area and a non-sludge outlet area, and cover the circle of holes.

9. The circular rotary-disc dehydrator with the multi-filter cylinder unit according to claim 1, wherein the water entrance area is a flocculation stirring area, the flocculation stirring area is provided with a metering tank, and the metering tank is provided with a sewage inlet and an overflow port; and a stirrer is arranged in the flocculation stirring area.

10. The circular rotary-disc dehydrator with the multi-filter cylinder unit according to claim 1, wherein the fixed ring is provided with a second through hole for passing through the connecting rod, the spacing washer is provided with a third through hole for passing through the connecting rod, the front plate and the rear plate are provided with a fourth through hole for passing through the connecting rod, and both ends of the connecting rod are limited by a limiting assembly; the connecting rod is a threaded rod, and the limiting assembly is a nut; the plurality of movable rings are provided with a fifth through hole for passing through the shaft; the fifth through hole is a hexagonal hole, and a cross section of the shaft is hexagonal; and the shaft and the screw shaft are connected by connecting plates.

\* \* \* \* \*